Patented Oct. 25, 1938

2,134,086

UNITED STATES PATENT OFFICE 2,134,086

CHEMICAL PROCESS

Robert W. Maxwell, Wilmington, Del., assignor to E. I. du Pont de Nemours & Company, Wilmington, Del., a corporation of Delaware No Drawing. Application June 1, 1937, Serial No. 145,909

8 Claims. (Cl. 260—152)

This invention relates to the preparation of cellulose ethers and more particularly to the preparation of cellulose ethers soluble in organic solvents and still more particularly to organic solvent-soluble cellulose ethers containing methallyl groups.

This invention has as an object the preparation of organic solvent-soluble cellulose ethers containing methallyl groups. A further object is the preparation of cellulose ethers containing non-olefinic aliphatic ether groups and methallyl groups. A still further object is the preparation of cellulose ethers containing methallyl groups which can be polymerized to give products insoluble in organic solvents. These and other objects will more clearly appear hereinafter.

These objects are accomplished by the following invention wherein cellulosic material is reacted with an active non-olefinic aliphatic etherifying agent for cellulose and a methallyl (by the term "methallyl" is meant the alkyl radical

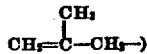

etherifying agent for cellulose, the relative amounts of etherifying agents and the degree of reaction being so adjusted as to yield an organic solvent-soluble methallyl ether of cellulose.

Organic solvent-soluble unsaturated ethers of cellulose have heretofore been prepared by one of two methods. In one, the cellulose is reacted with an unsaturated halide in the presence of caustic alkali; and in the other, a mixture comprising an active non-olefinic aliphatic etherifying agent for cellulose and an unsaturated halide has been used as the etherifying agent. By either method, solubility in organic solvents generally results when the cellulose is substituted to any degree beyond a minimum which varies somewhat with the substituent, and no control of the degree of substitution need be exercised save that this minimum be exceeded. Organic solvent-soluble methallyl ethers of cellulose, however, cannot be prepared by these known methods. Thus, if cellulose is treated in the presence of caustic alkali with methallyl halide in the way which customarily gives a soluble ether with other etherifying agents such as the closely related crotyl halide, an ether of far too low a degree of substitution to be soluble in organic solvents results. On the other hand, if the cellulose be highly substituted as by the action thereon of a mixture comprising a low proportion of an active etherifying agent for cellulose and a high proportion of methallyl halide, again a methallyl ether of cellulose is obtained which is of a high degree of substitution insoluble in organic solvents. I have found, however, that when the proportion of active etherifying agent in the mixture above is increased, a mixed ether of an intermediate degree of substitution of methallyl groups is obtained which ether is soluble in organic solvents.

In carrying out my invention, cellulosic material in the presence of a caustic alkali is reacted with a methallylating agent and an active non-olefinic aliphatic etherifying agent for cellulose which introduces no acid groups and which normally gives a soluble cellulose ether by its own action, the action of the saturated etherifying agent being effected at least as soon as with the methallylating agent, the etherifying action of the methallylating agent being terminated when up to 1.5 methallyl ether groups per glucose unit of cellulose have been introduced and the etherifying action of the active etherifying agent being continued at least until sufficient non-olefinic aliphatic ether groups have been introduced together with the methallyl groups to render the product soluble in organic solvents. Control of the action of the various etherifying agents is generally effected by limiting the quantity of reagent, although it may also be restricted by limiting the time during which the agent acts. The total quantity of etherifying agent needed is somewhat dependent upon the reaction conditions and the concentration of alkali in the reaction mass. In general, however, not less than a total of 7 mols of etherifying agent are required for the reaction. Of this, at least 35 mol. per cent and preferably 50 mol. per cent should consist of the active etherifying agent for cellulose, while not more than 65 mol. per cent and preferably less than 50 mol. per cent should consist of methallylating agent.

The relative proportions of saturated ether groups and methallyl groups introduced into the cellulose nucleus are critical and successful preparation of a soluble product depends upon this variable. I have found, for instance, that ethers containing more than 1.5 methallyl groups and less than 1.0 ethyl groups are too insoluble in organic solvents to be useful for the preparation of films, filaments, etc., from solutions. Mixed ethers containing less than 1.5 methallyl groups are of a sufficient degree of solubility to permit formation of useful products from their solutions. The point of demarcation between soluble and insoluble products is not sharp and the degree of substitution will depend to some extent upon the degree of degradation of the cellulose, the nature of the other ether groups present, and other variables. The most useful products are those containing up to 1.2 methallyl groups and approximately 1.2 or more of other ether groups. The quantity of non-olefinic ether group necessary varies somewhat with the nature of the group. Thus, less of a large group such as benzyl is necessary than of a low molecular weight group such as ethyl.

Due to the influence of oxygen as a catalyst on the polymerization of vinyl compounds in general, it is preferable to carry out the etherification and subsequent purification treatments under non-oxidizing conditions in order to obtain good solubility characteristics. This can be done by either excluding oxygen from the system or by addition of strong reducing agents such as sodium hydrosulfite or formaldehyde to the etherification medium. It is possible to use other types of antioxidants, such as hydroquinone and creosole, during the purification treatments since these operations are carried out at much lower temperatures and weaker concentrations of alkali.

In effecting the reaction, the action of the active etherifying agents may be carried out previous to or simultaneously with that of the methallylating agent.

Purification of the product can be carried out by any of the methods commonly used for the purification of cellulose ethers. This is well known in the art and needs no description here. However, as pointed out above, I have found it desirable to add a small proportion of a polymerization inhibitor such as hydroquinone or creosole to the mixture just before purification is commenced. Creosole is especially useful because it does not darken the product as do most other antioxidants.

The following examples illustrate the invention.

Example I

One hundred (100) grams of cotton linter pulp was steeped for two hours in 50% sodium hydroxide solution at 20° C. It was then pressed to 328 grams and shredded for one hour with 147 grams of flake sodium hydroxide. The alkali cellulose was placed in a nickel autoclave and a mixture of 450 grams of benzene, 228 grams of methallyl chloride, 244 grams of ethyl chloride and 10 grams of dry sodium hydrosulfite added, after which the autoclave was closed and heated with stirring at 105°–110° C. for twenty-six hours. The reaction mixture was a very viscous solution. It was purified by suspension in hot water containing Turkey-red oil followed by distillation of by-products and solvent in a current of steam. One (1) gram of hydroquinone was added to the steam distillation mixture. After distillation the product was ground, washed thoroughly with water until alkali-free and dried at 65° C. The product was soluble in toluene 80—ethyl alcohol 20; chloroform; benzene 80—alcohol 20, and ethyl acetate. It could be cast to very flexible films which upon heating became insoluble in organic solvents. The insolubilization was accelerated by ultra-violet light or when benzoyl peroxide was added to the solution from which the film was cast. Unless great care is exercised, polymerization occurs in the autoclave during the reaction. This results in products of poor solubility. It has been found that this tendency can be overcome by the addition of reducing agents such as sodium hydrosulfite or formaldehyde to the reaction mixture. Displacement of the air in the mixture with nitrogen gives some advantage but is not sufficient to overcome the polymerization tendency in many instances.

Example II

The procedure was the same as that used in Example I except that the methyl chloride was introduced in quantity equivalent to the ethyl chloride of Example I by nitrogen pressure after the autoclave was closed. The two products resembled each other closely. The methyl methallyl ether of cellulose gave an excellent solution in ethyl alcohol.

Example III

Three hundred (300) grams of cotton linter board was steeped in 50% sodium hydroxide solution in water for two hours and then pressed to 984 grams, after which it was shredded with 366 grams of sodium hydroxide. The alkali cellulose was then placed in an autoclave with 1050 grams of benzene and 334 grams of ethyl chloride. The mixture was heated at 125° C. for twelve hours. The product was a stiff, fibrous mixture highly swollen by the reaction media. It was removed from the autoclave and purified by steam distillation and washing until alkali-free. When dry it possessed its original fibrous form.

One hundred fifteen (115) grams of the above ethyl cellulose was placed in an autoclave with 320 grams of 50% sodium hydroxide at room temperature, followed by addition of 40 grams of flake sodium hydroxide. A mixture of 300 parts of benzene and 230 grams of methallyl chloride was then added. The mixture was heated at 100°–110° C. for eighteen hours. The product was a moderately viscous solution. It was purified as described in Example I. It resembled the product of Example I very closely except that it was more readily insolubilized by heating.

Example IV

One hundred (100) grams of cotton linter board was steeped in 50% sodium hydroxide for two hours at 20° C., pressed to 328 grams and then shredded with 147 grams of flake sodium hydroxide. The resulting alkali cellulose was put into an autoclave with a mixture of 350 grams of benzene and 163 grams of ethyl chloride. The mixture was heated for twelve hours at 125° to 130° C. After cooling the autoclave, 284 grams of methallyl chloride was added and the autoclave heated to 105° C. for eighteen hours. The product was of high viscosity and good solubility. It was purified as in Example I. The proportion of high boiling by-product in this run was unusually low. This was evidenced by the short time required for steam distillation.

In general, high reaction temperatures give low viscosity products and serious corrosion to autoclaves. High proportions of by-products also result. These difficulties are overcome by lower reaction temperatures which, however, extend the reaction time considerably.

Example V

One hundred (100) grams of cotton linter wood cellulose was steeped in 50% sodium hydroxide at 20° C. for two hours. It was shredded with 157 grams of sodium hydroxide after which it was put into an autoclave with 273 grams of ethyl chloride and 450 grams of benzene. The mixture was heated at 130° C. for ten hours, after which the autoclave was cooled partially and 170 grams of methallyl chloride was introduced. The mixture was heated at 100° C. for sixteen more hours. The reaction mass was a high viscosity solution. It was purified in the presence of a small proportion of creosole. The product gave a smooth, viscous solution in toluene 80—ethyl alcohol 20. It gave films of excellent properties when flowed on glass plates. It could be insolubilized only by a drastic heating treatment.

The method of preparing organic solvent-soluble methallyl ethers of cellulose is, of course, capable of considerable variation. The starting cellulose may be any variety of purified cellulose. However, in most instances cotton linters of the type used in the preparation of viscose rayon or cellulose acetate, or cellulose from wood as used in the viscose rayon industry are preferred because of their low degree of degradation. The methallyl halides are particularly desirable agents for introducing the methallyl group. The chloride is especially useful because of its cheapness. The bromide, however, gives soluble products at lower reaction temperatures and accordingly gives less degradation. The non-olefinic aliphatic ether group to be introduced along with the methallyl group may be any alkyl or aralkyl group which does not introduce free acid groups and which is readily introduced into cellulose without excessive degradation. In general, these reagents are characterized by the fact that they give soluble cellulose ethers by themselves through reaction with cellulose in the presence of caustic alkali. For this purpose the methyl and ethyl groups introduced by their respective halides or sulfates are particularly applicable. Other suitable reagents are compounds such as aralkyl halides which introduce aralkyl groups and chlorohydrins or alkylene oxides of sufficient reactivity to introduce hydroxyalkyl groups into cellulose. Active etherifying agents which introduce ether groups containing free acid groups such as carboxyl do not give mixed methallyl ethers with good solubility characteristics in organic solvents.

Products of best physical properties result when the methallylation takes place at a moderate temperature. When the methallylation agent is the chloride, the preferred range of reaction temperatures is 80°–120° C.

Any caustic alkali which gives an organic solvent-soluble ethyl cellulose by the action of ethyl chloride on cellulose in its presence is suitable for the reaction. In general, concentrations of caustic alkali above about 40% are desirable in order to give efficient utilization of etherifying agent.

The products of my invention find use in a wide variety of ways. They are useful for the preparation of coating materials, artificial filaments, bristles, coated fabrics, sizing of textiles, molded products, adhesives and the like. The presence of the higher molecular weight ether groups in the cellulose ether renders the ether of improved resistance toward water. On the other hand the unsaturated linkage in the ether group also imparts unique solubility to the products. Unlike the solutions of most cellulose ethers, solutions of this product may be diluted with large proportions of acetone without precipitation and, in some instances, the products themselves are completely soluble in acetone. An outstanding property of the products of higher degrees of methallylation is their ability to polymerize to forms which are insoluble in all solvents. This overcomes one of the serious disadvantages of most cellulose ethers, namely, their tendency to dissolve in almost all organic solvents. Although the wide range of solvents in which cellulose ethers dissolve is considered one of their outstanding advantages, it is also a serious disadvantage when uses for the fabricated products are considered. Ethyl cellulose, for example, cannot be used in the presence of benzene or alcohol, or in the presence of chlorinated solvents such as are used for dry cleaning. The presence of a polymerizable group in the ether overcomes this disadvantage without doing away with the desirable wide range of solubility shown by the original ethers.

The above description is for purposes of illustration only, it being understood that variations in materials, proportions and reaction conditions which are within the spirit of my invention though not specifically recited herein are to be included within the scope of my invention as defined in the following claims.

I claim:

1. A process according to claim 8 wherein the cellulosic material is reacted first with the active non-olefinic aliphatic etherifying agent and then with the methallyl etherifying agent.

2. A process according to claim 8 wherein the cellulosic material is etherified with a mixture of active non-olefinic aliphatic etherifying and methallyl etherifying agents.

3. A process according to claim 8 in which the etherification is carried out under non-oxidizing conditions.

4. A process for preparing organic-soluble mixed non-olefinic aliphatic methallyl ethers of cellulose which comprises reacting cellulose with an active non-olefinic aliphatic etherifying agent which will not introduce an acid-containing ether group, and a methallyl etherifying agent in the presence of caustic alkali and at a temperature within the range of about 80° C. to about 120° C., and continuing the reaction until a mixed ether of cellulose soluble in organic solvents and containing not less than 1 non-olefinic non-acidic aliphatic group and about 1.2 methallyl groups per glucose unit of cellulose is obtained.

5. A process for preparing organic-soluble mixed neutral non-olefinic aliphatic methallyl ethers of cellulose which comprises reacting cellulose with an active non-olefinic aliphatic etherifying agent which will not introduce an acid-containing ether group, and a methallyl etherifying agent in the presence of caustic alkali and sodium hydrosulfite, and at a temperature within the range of about 80° C. to about 120° C., and continuing the reaction until a mixed ether of cellulose soluble in organic solvents and containing not less than 1 non-olefinic non-acidic aliphatic group and about 1.2 methallyl groups per glucose unit of cellulose is obtained.

6. As a new product, a mixed non-olefinic aliphatic methallyl ether of cellulose which is soluble in organic solvents and which contains not more than about 1.5 methallyl groups and not less than about 1 non-olefinic non-acidic aliphatic group per glucose unit of cellulose.

7. As a new product, a mixed non-olefinic aliphatic methallyl ether of cellulose which is soluble in organic solvents and which contains about 1.2 methallyl groups and not less than about 1.2 non-olefinic non-acidic aliphatic groups per glucose unit of cellulose.

8. A process for preparing organic-soluble mixed non-olefinic aliphatic methallyl ethers of cellulose which comprises reacting a cellulosic material with not less than 7 mols of total etherifying agent, said etherifying agent comprising not less than 35 mol. per cent of active non-olefinic aliphatic etherifying agent which will not introduce acid-containing ether groups, and not more than 65 mol. per cent of methallyl etherifying agent, and continuing the reaction until a mixed ether soluble in organic solvents and containing not more than 1.5 methallyl groups per glucose unit of cellulose is obtained.

ROBERT W. MAXWELL.

CERTIFICATE OF CORRECTION.

Patent No. 2,134,086.                 October 25, 1938.

ROBERT W. MAXWELL.

It is hereby certified that error appears in the printed specification of the above numbered patent requiring correction as follows: Page 1, second column, line 24, for "metallyl" read methallyl; and that the said Letters Patent should be read with this correction therein that the same may conform to the record of the case in the Patent Office.

Signed and sealed this 20th day of December, A. D. 1938.

(Seal)                                         Henry Van Arsdale
                                                 Acting Commissioner of Patents.

mixed non-olefinic aliphatic methallyl ethers of cellulose which comprises reacting a cellulosic material with not less than 7 mols of total etherifying agent, said etherifying agent comprising not less than 35 mol. per cent of active non-olefinic aliphatic etherifying agent which will not introduce acid-containing ether groups, and not more than 65 mol. per cent of methallyl etherifying agent, and continuing the reaction until a mixed ether soluble in organic solvents and containing not more than 1.5 methallyl groups per glucose unit of cellulose is obtained.

ROBERT W. MAXWELL.

CERTIFICATE OF CORRECTION.

Patent No. 2,134,086.                                   October 25, 1938.

ROBERT W. MAXWELL.

It is hereby certified that error appears in the printed specification of the above numbered patent requiring correction as follows: Page 1, second column, line 24, for "metallyl" read methallyl; and that the said Letters Patent should be read with this correction therein that the same may conform to the record of the case in the Patent Office.

Signed and sealed this 20th day of December, A. D. 1938.

(Seal)                                          Henry Van Arsdale
                                                  Acting Commissioner of Patents.